Figure 1:
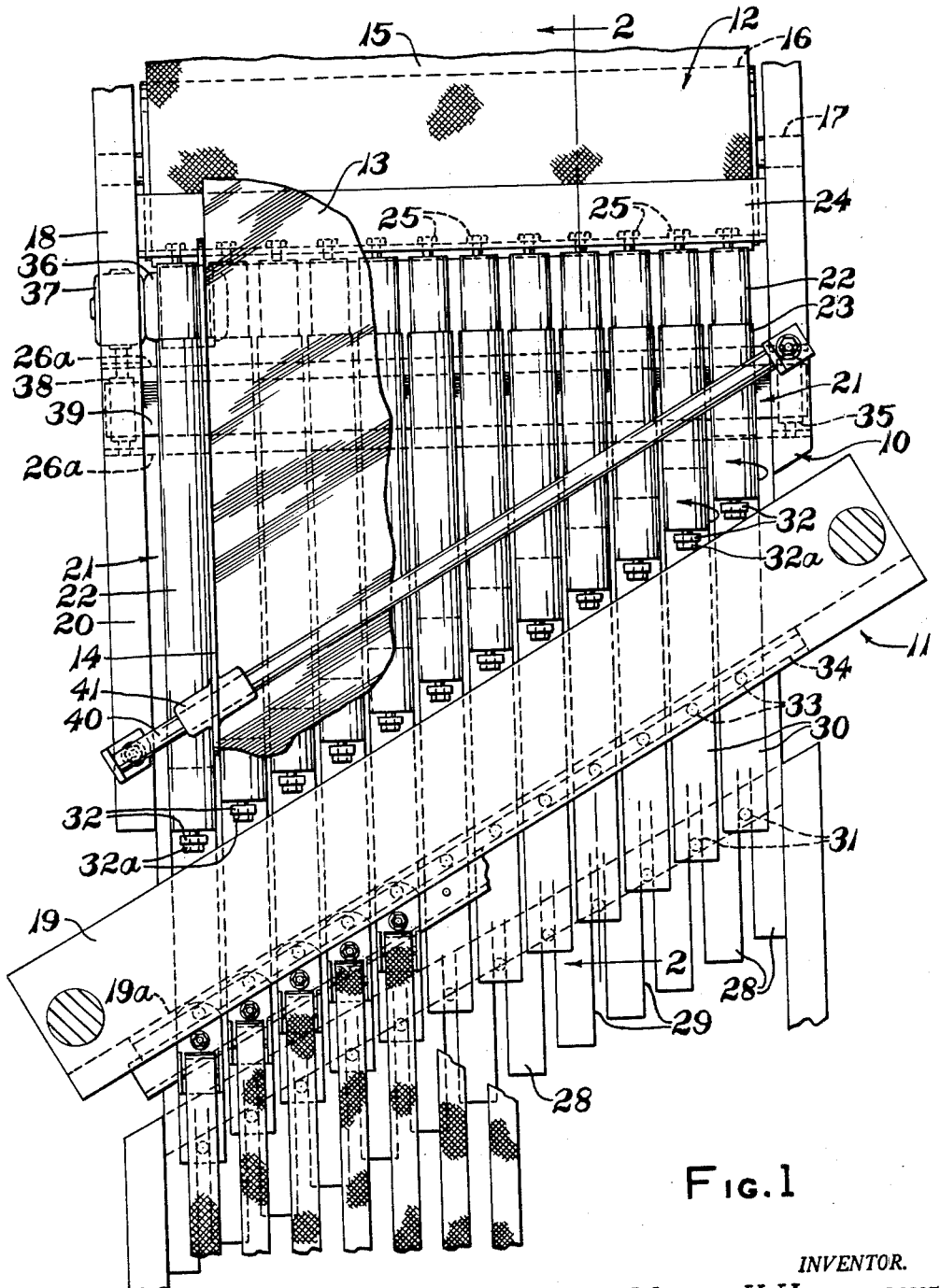

July 14, 1964   V. H. HASSELQUIST   3,140,868
EDGE ALIGNMENT APPARATUS
Filed Nov. 30, 1961   2 Sheets-Sheet 1

INVENTOR.
VICTOR H. HASSELQUIST
BY
William J. Reeve
ATTY.

July 14, 1964  V. H. HASSELQUIST  3,140,868
EDGE ALIGNMENT APPARATUS

Filed Nov. 30, 1961  2 Sheets-Sheet 2

INVENTOR.
VICTOR H. HASSELQUIST
BY
William L. Reeve
ATTY.

United States Patent Office 3,140,868
Patented July 14, 1964

3,140,868
EDGE ALIGNMENT APPARATUS
Victor H. Hasselquist, Akron, Ohio, assignor to The B. F. Goodrich Company, New York, N.Y., a corporation of New York
Filed Nov. 30, 1961, Ser. No. 155,996
5 Claims. (Cl. 271—59)

This invention relates to sheet material alignment apparatus particularly suitable for aligning fabric sheet material as it is moved in the direction of its length; and, more particularly, to an apparatus for aligning one edge of spliced bias cut elastomeric cord fabric as it moves from an appropriate angularly adjustable splicing device to a takeoff conveyor.

The edge alignment apparatus of this invention is characterized in that it has fabric engaging members which act to align the fabric without distorting, warping or wrinkling such material; and that it has a receiving end which is angularly adjustable relative to the direction of the length of said fabric being aligned thereon. Accordingly, even though the relative position of the splicing device and the direction of movement of the fabric is changed from time to time, all portions of the receiving end of the alignment apparatus remain in contiguous relationship with the material discharge side of the splicing device as it is angularly adjusted, while the delivery end of the alignment apparatus is presented to the takeoff conveyor in its original orientation.

The tire cord fabric splicing system described in co-pending application Serial No. 598,313, now U.S. Patent No. 3,130,100, is an example of a system in which this invention may be advantageously used. The tire cord fabric is bias cut at one location and the cut pieces are then transferred in succession to a splicer mechanism by suitable conveying means. At times, the individual pieces of bias cut cord fabric are not properly aligned laterally for subsequent winding or building operations as they approach the splicing mechanism so that they continue to be misaligned as they leave the splicing mechanism in the form of a continuous strip. Therefore, the transporting of this strip over and upon the alignment apparatus of the present invention causes it to become perfectly aligned with preceding increments of the strip along a predetermined path.

According to the invention, the alignment apparatus in its preferred form embodies one or more axially parallel telescoping rolls having their axes coplanar and extending in a direction parallel to the direction of travel of said spliced strip of cord fabric; each such roll having a polished, cylindrical, material engaging outer surface; each such roll having its fabric receiving end mounted for axial movement in response to angular changes in the positioning of the splicing mechanism while its fabric delivery end is permanently positioned; and each such roll being rotated in the same direction about its axis to urge said strip, while moving in the direction of its length, laterally sideways against a strip edge guide the position of which may be adjustably positioned laterally of the direction of the strip's movement.

The invention will be further described with reference to the accompanying drawings forming part of this application in which one preferred apparatus embodying this invention is illustrated.

Figure 2:
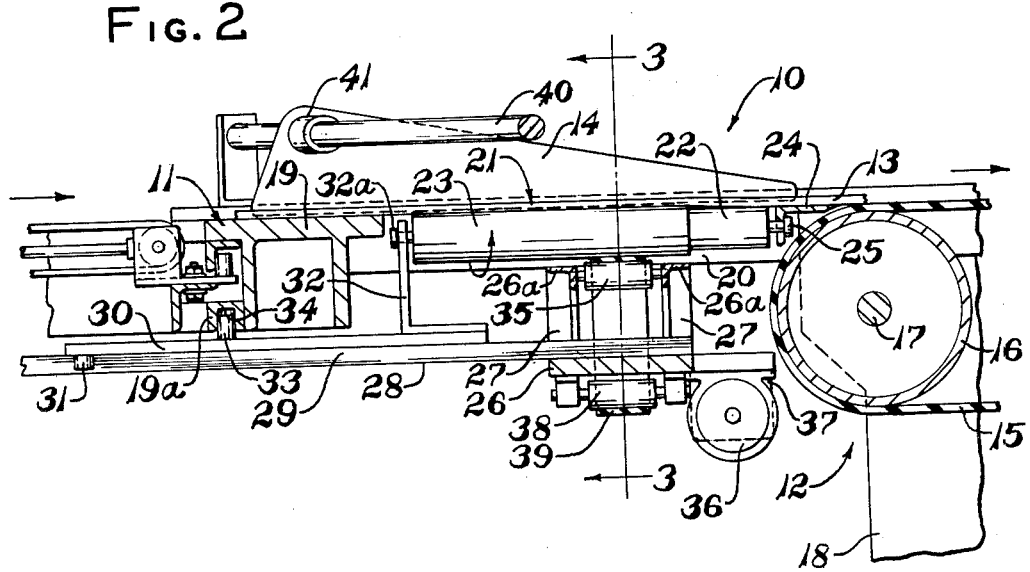
Figure 3:
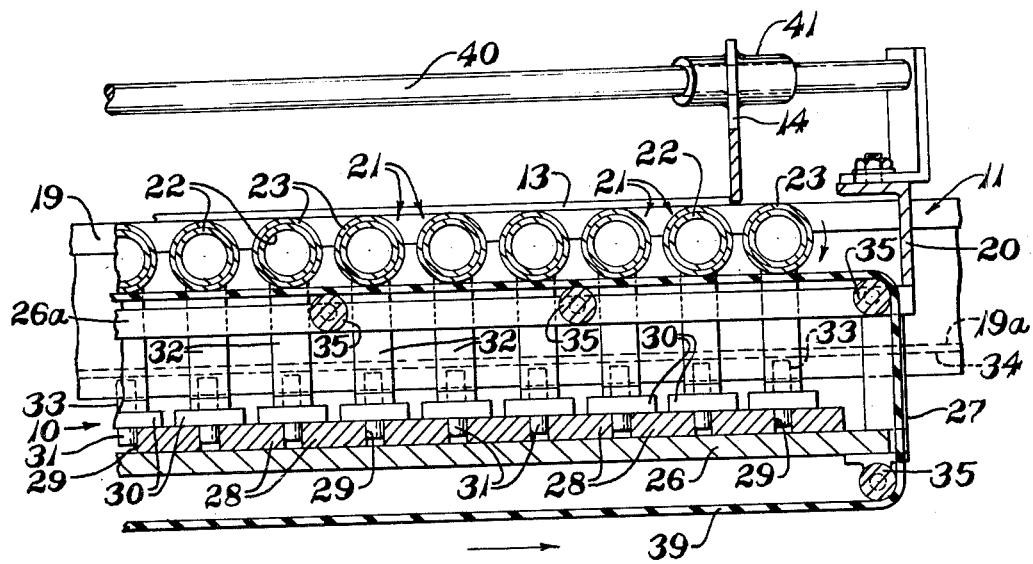

In the drawings:
FIG. 1 is a plan view of the alignment apparatus in association with a splicing mechanism and a material takeoff conveyor;
FIG. 2 is a front elevational view of the alignment apparatus, partially in section, taken along line 2—2 of FIG. 1, illustrating the mounting of the strip alignment rolls; and FIG. 3 is a side elevational view, partially in section, of the alignment apparatus, taken along the line 3—3 of FIG. 1 showing the slideways for the moveable mounting of the receiving end of the strip alignment rolls, and the roll drive means.

Referring to FIG. 1, an alignment apparatus according to this invention is installed as a fabric edge alignment apron 10 between the material discharge side of a fabric edge splicer 11, and the receiving end of a material takeoff conveyor 12. The takeoff conveyor 12 draws a continuous length of elastomeric cord fabric 13, formed from individual pieces of bias cut cord fabric which have been spliced edge to edge by the splicer 11, over the alignment apron 10, to subsequent processing equipment, such as material windup devices or automatic tire or hose building machines. In the use of such machines it is imperative that the fabric material being supplied is at all times properly aligned with itself as it is fed or drawn into the machinery. The apron 10 includes a laterally adjustable, longitudinal guide rail 14 against which the fabric 13 is positioned as it is moved from the splicer 10.

The takeoff conveyor 12 comprises a flexible belt 15, the rear portion of which is shown in the drawings trained about a tail roll 16 supported on a shaft 17. Shaft 17 is journalled at its ends in the main conveyor frame members 18, on opposite sides of the conveyor 12. The belt 15 is driven at its discharge end, by means not shown.

The alignment apron 10 is located between the splicing table 19 of the splicer 11 and the takeoff belt 15 and includes a generally trapezoidal rigid frame 20, which is secured to the main frame 18 of the takeoff conveyor 12 and projects therefrom in cantilever fashion toward the splicing table 19.

The alignment apron 10 includes a plurality of axially parallel and coplanar, telescoping rollers 21 supported for rotation about their longitudinal axes which are disposed parallel to the edge guide rail 14. The rollers 21 are of varying effective lengths corresponding to the trapezoidal shape of the frame 10. This variation in roller length has an additional benefit not readily apparent. It will be seen that the longest of the rollers 21 utilized for any given position of the guide rail 14 is that roller situated immediately adjacent the guide rail 14. The force exerted by each roller 21 progressively farther from the rail 14 is lessened in proportion to its length. Therefore, the rollers exert greatest force on that portion of the fabric 13 nearest the rail 14, tending to pull rather than push the fabric, thereby resulting in freedom from wrinkles and other unwanted distortions in the fabric which are commonly encounted when it is pushed rather than drawn. In addition, each roll 21 is smoothly polished to enable the roll to slip with respect to the fabric 13 when the fabric is in contact with the guide rail 14.

Each roller 21 comprises a male portion 22 and a female portion 23 telescopically engaged with said male portion. The outer end of the male portion 22 of each roller 21 is supported for free rotation in a cross-frame member 24 of frame 20 by means of bearings 25. Beneath the rollers 21 a sub-frame member 26 is mounted between vertical side supports 27 which depend from a pair of cross-frame members 26a. Extending from the member 26 in cantilever fashion are a plurality of slideway guides 28 spaced laterally from one another to define slideways 29. Slideably mounted on the upper surface of the guides 28 are slide members 30 each having a bearing 31 mounted on its underside engaged in one of the slideways 29. On the upper side of each slide member 30 is a vertical mounting bracket 32 in which the end of the female portion 22 of one of the rollers 21 is journalled by means of a bearing 32a. Also mounted on the upper side of each slide member 30 is a cam 33 which is engaged with a cam track 34 formed by channel beam 19a mounted on the lower side of the splicing table 19. Thus, it will be seen that as the angular position of the splicer 11 is changed in accordance with changes in the angle at which the individual pieces of fabric forming the strip 13 are bias cut, the cams 33 are moved in response thereto to axially move the female portions 23 of the rollers 21 telescopically over male roller portions 22 in proportion to the respective change in distance between the splicing table 19 and the takeoff conveyor 12.

Mounted between cross-frame members 26a, and at one end of the underside of sub-frame member 26, parallel to the rollers 21, are rotatable idler rolls 35. Also mounted on the underside of member 26 is a drive motor 36, connected to a reducer 37, which is connected to a rotatable belt drive roll 38 also mounted on the underside of member 26. Trained about the rolls 35 and the drive roll 38 is a flat, flexible drive belt 39, the outer surface of which is engaged with the undersides of the rollers 21. Thus, as the belt 39 is driven by the motor 36, the rollers 21 are all caused to rotate in the same direction to continuously urge the strip of cord fabric 13 being drawn over the rollers 21 by takeaway conveyor 12 to be urged laterally toward the guide rail 14. Guide rail 14 is slideably mounted on a diagonal support rod 40 by means of a collar 41 whereby the train of the fabric 13 may be laterally controlled.

Although the invention has been described with reference to a specific embodiment thereof, changes and variations may be made thereto within the scope of the appended claims which follow.

I claim:

1. Sheet material edge alignment apparatus having one end which is angularly adjustable relative to the direction of the length of said apparatus, comprising a plurality of longitudinally contractible and extensible material supporting members rotatably mounted on said apparatus, means responsive to angular adjustment of said one end to contract at least one of said members and to extend the others of said members, material edge guide means mounted on said apparatus parallel to the direction of the length of said apparatus, and means to rotate said members whereby said material supported thereby is urged toward said guide means.

2. Sheet material edge alignment apparatus in combination with a material takeaway conveyor and material-working equipment, which equipment is mounted for angular adjustment relative to the conveying direction of said conveyor; said apparatus comprising a plurality of rotatable telescoping rollers; means adjacent said conveyor mounting one end of each of said rollers for rotation about its longitudinal axis; means slideably mounted on said apparatus rotatably mounting the other end of each of said rollers; cam means responsive to changes in the angular adjustment of said equipment to move said last mentioned means axially of said rollers to automatically and proportionally adjust the length of said rollers with respect to said angular adjustment.

3. Edge alignment apparatus for handling sheet material, in combination with and disposed between angularly adjustable equipment for performing work on the edges of said material and a conveyor for removing said material from said equipment over and upon said apparatus; said apparatus comprising a plurality of rotatable, telescoping, polished rollers disposed axially parallel to one another; means mounting one end of each of said rollers for rotation about its longitudinal axis adjacent the material receiving end of said conveyor; a plurality of slide guides mounted on said apparatus; a slide member slideably mounted for movement in said slide guides; a roller mounting bracket mounted on each of said slide members, to each of which brackets the other end of one said rollers is rotatably mounted; cam means connecting said slide members and said equipment whereby the length of said rollers are automatically and proportionally adjusted in response to changes in the angular adjustment of said equipment; material edge guide means disposed parallel to the axes of said rollers; and means to rotate said rollers in a direction to urge said material toward said guide means.

4. Apparatus as defined in claim 3; wherein said rollers are disposed in a horizontal plane, and the means to rotate said rollers comprises an endless flexible belt tangentially engaging said rollers and trained in a plane perpendicular to the axes of said rollers, and means to drive said belt in the direction of its length.

5. Apparatus as defined in claim 3, wherein said guide means is adjustably mounted for movement on said apparatus laterally of the direction of movement of said conveyor.

References Cited in the file of this patent

UNITED STATES PATENTS

| | | |
|---|---|---|
| 1,626,352 | Olson | Apr. 26, 1927 |
| 1,954,278 | Adams | Apr. 10, 1934 |
| 2,130,330 | Sibley | Sept. 13, 1938 |
| 2,487,149 | Leguillon | Nov. 8, 1949 |
| 2,940,506 | McKee et al. | June 4, 1960 |
| 3,036,691 | Byrnes | May 29, 1962 |